United States Patent [19]

Fishwick

[11] Patent Number: 5,096,144
[45] Date of Patent: Mar. 17, 1992

[54] REVERSER DOOR ACTUATION MECHANISM

[75] Inventor: Ronald E. Fishwick, Palm Beach Gardens, Fla.

[73] Assignee: United Technologies Corporation, Hartford, Conn.

[21] Appl. No.: 670,666

[22] Filed: Mar. 18, 1991

[51] Int. Cl.⁵ .............................................. B05B 12/00
[52] U.S. Cl. ................................ 244/110 D; 244/113; 244/213; 239/265.29
[58] Field of Search ........... 244/110 A, 110 B, 110 D, 244/113, 75 R, 213, 102 R, 102 A; 239/265.29, 265.33, 265.37, 265.39; 60/226.2

[56] References Cited

U.S. PATENT DOCUMENTS

| | | |
|---|---|---|
| 2,041,688 | 5/1936 | Barnhart ............................. 244/113 |
| 2,353,303 | 7/1944 | Gray .................. 244/110 D |
| 2,723,091 | 11/1955 | Davies et al. ........................ 244/113 |
| 2,927,469 | 5/1958 | Zerwinski ............................ 244/113 |
| 3,335,960 | 8/1967 | Alderson ............................. 239/265 |
| 3,640,469 | 2/1972 | Hayes et al. .................... 239/265.35 |
| 4,216,926 | 8/1990 | Lawson ............................. 60/226.2 |
| 4,372,507 | 2/1983 | Denniston ........................... 244/113 |
| 4,407,120 | 10/1983 | Timms ............................. 239/265.31 |

Primary Examiner—Joseph F. Peters, Jr.
Assistant Examiner—Vinua Lissi Mojica
Attorney, Agent, or Firm—Edward L. Kochey, Jr.

[57] ABSTRACT

Reverser doors on an aircraft are to be opened, closed and splayed to effect pitch and yaw control in combination with reverse thrust. A first actuator achieves open and close control. A second actuator achieves splay control through a linkage, with the first actuator located within the linkage.

8 Claims, 1 Drawing Sheet

REVERSER DOOR ACTUATION MECHANISM

The Government has rights in this invention pursuant to a contract awarded by the Department of the Air Force.

TECHNICAL FIELD

The invention relates to variable splay and pitch reverser doors for aircraft, and in particular to a mechanism for actuating these doors.

BACKGROUND OF THE INVENTION

Jet engine aircraft achieve forward thrust by ejecting gas rearwardly during flight. Reverse thrust is used to decelerate the aircraft. This is achieved by throttling or closing the rear exhaust and directing gas radially from the aircraft with some forward component.

When used in flight, pitch and yaw control is desirable in combination with this reverse thrust. This may be achieved with reverser doors located in the reverser duct. Relative opening of the top and lower door sets will produce pitch control. Splaying the doors transverse to the aircraft center line will produce yaw.

The amount of opening of the doors and the splay of the doors must be modulated. The control system is simplified if the linkage can be arranged where control of one actuator would control the opening of the doors and control of a second actuator would control the splay of the doors.

SUMMARY OF THE INVENTION

A door set is located in each reverser exhaust duct of an aircraft. Each door set has two doors with fixed pivots located on the frame. The doors are sized and shaped to abut each other in a closed position filling the space between the pivots and thereby closing the exhaust opening.

A first actuator is connected to open and close the doors. This preferably pivots an input link around the pivot point with connections on either side of the pivot point connecting links to the doors.

A second actuator varies the splay of the doors. This is accomplished by the second actuator moving the entire linkage including the first actuator thereby effecting the splay of all the doors. This second actuator must be returned to its initial reset position to permit full closure of the doors.

BRIEF DESCRIPTION OF THE DRAWING

The drawing is an isometric view showing a pair of door sets, the two actuators and the linkage.

DESCRIPTION OF THE PREFERRED EMBODIMENT

Figure 1:
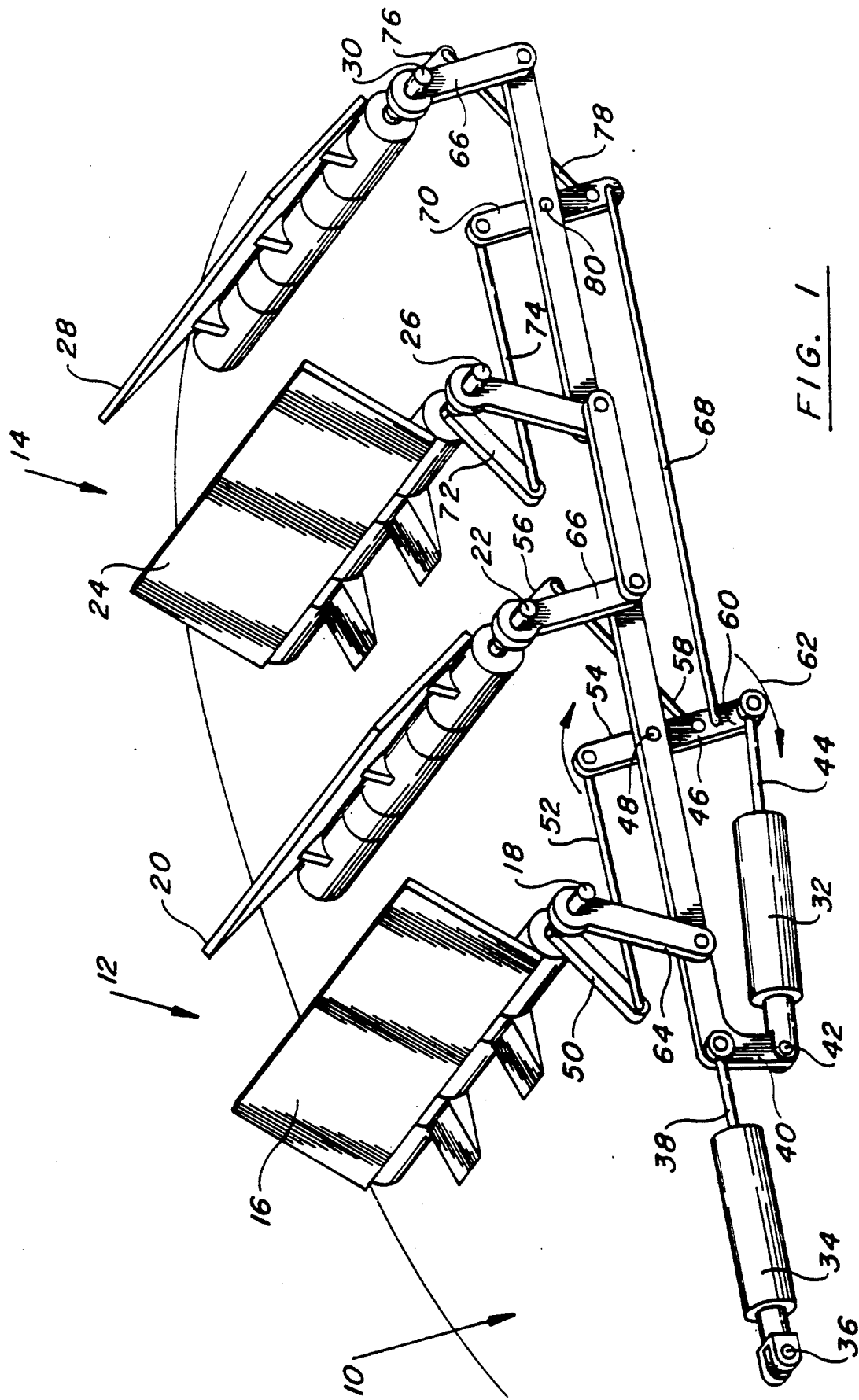

Airframe 10 carries on its surface door sets 12 and 14, these door sets are located at the exhaust of reverser flow ducts and are operable to throttle the flow by opening and closing varying amounts. They are operable to splay the flow to either side by controlling the relative position between the two doors. Door 16 is secured to and rotatable around pivot 18 which is located on the surface of the airframe. Door 20 is similarly connected to pivot 22. Door set 14 in a similar manner has door 24 connected to pivot 26 and door 28 connected to pivot 30.

A first actuator 32 and a second actuator 34 are used to control the opening and the splay of the doors. The second actuator 34 is connected to the airframe at fixed end 36 with the output end 38 connected to splay link 40.

A first actuator 32 is connected to the splay link 40 at its fixed end 42 while the output end 44 is connected to input link 46. A central pin 48 pivotally connects the input link 46 with the splay link 40. Operation of actuator 32 thereby rotates this input link around the pin.

Output link 50 is secured to door 16, extending outwardly from the pivot 18. It can be seen that movement of this link will thereby move door 16. Drive link 52 is connected to link 50 at a first end 54 of input link 46. It can be seen that movement of link 52 will move door 16.

Output link 56 secured to door 20 is connected through drive link 58 to side 60 of input link 46. This connection is on the opposite side of pin 48 so that on rotation of link 46 in the direction shown by arrows 62, doors 20 and 16 will both open.

Support links 64 and 66 are freely pivotal on pins 18 and 22, respectively, and are for the purpose of supporting splay link 40. Inspection of the linkage will show that actuator 32 operating through turn link 46 operates to open and close the doors. Operation of the second actuator 34 moves the entire linkage including the first actuator 32 and pin supports 48. This translation of the linkages then splays doors 16 and 20 to the left when splay link 40 moves to the right, and vise versa.

Connecting link 68 connects input link 46 to input link 70 of door set 14. Output link 72 secured to door 24 is operated through drive link 74 from input link 70. In a similar manner output link 76 is driven through drive link 78 from the other end of input link 70 with respect to the pivot point 80.

By this arrangement the first actuator 32 controls the opening and closing of door sets 12 and 14 with the second actuator 34 operating to vary the splay of the doors. Regardless of the splay, the first actuator 34 will operate to modulate the doors to a more open or more closed position. However, to completely close the doors the second actuator 34 must be in its original reset position.

I claim:

1. A reverser door actuating mechanism for an aircraft having at least two reverser door sets, each door set having two doors, two fixed door pivots at spaced locations with one of said doors secured to each pivot, said doors sized to close a space between said pivots, comprising:
   a first actuator;
   a first actuator linkage connected to said first actuator and to each door set for contra-rotating said doors of each door set;
   a second actuator; and
   a second linkage connected to said second actuator and to each door of said door sets for rotating said doors of each door set in the same direction.

2. An actuating mechanism as in claim 1 further comprising:
   said first actuator and said first linkage located within said second linkage;
   said second actuator secured to said airframe and moving said second linkage with respect to said airframe; and
   said first linkage secured to said second actuator and moving said first linkage with respect to said second actuator.

3. An actuating mechanism as in claim 2 further comprising:

an output link secured to each door extending outwardly from said pivot;

a splay link secured to said second actuator;

an input link centrally and pivotally supported from said pin support on said splay link;

a first drive link pivotally connected to the output link of one of said doors and pivotally connected to said input link on a first side of said central support; and a second drive link pivotally connected to the output link of the other of said doors and pivotally connected to said input link on a second side of said central support.

4. An actuating mechanism as in claim 3 further comprising:

said first actuator connected to pivot said input link around said central pin support; and said second actuator connected to translate said pin support with respect to said airframe.

5. A reverser door actuating mechanism for an aircraft having at least one reverser door set, each door set having two doors, two fixed door pivots at spaced locations with one of said doors secured to each pivot, said doors sized to close a space between said pivots, comprising:

a first actuator;

a first actuator linkage connected to said first actuator and to each door set for contra-rotating said doors of each door set;

a second actuator; and a second linkage connected to said second actuator and to each door of said door sets for rotating said doors of each door set in the same direction.

6. An actuating mechanism as in claim 5 further comprising:

said first actuator and said first linkage located within said second linkage;

said second actuator secured to said airframe and moving said second linkage with respect to said airframe; and said first linkage secured to said second actuator and moving said first linkage with respect to said second actuator.

7. An actuating mechanism as in claim 6 further comprising:

an output link secured to each door extending outwardly from said pivot;

a splay link secured to said second actuator;

an input link centrally and pivotally supported from said pin support on said splay link;

a first drive link pivotally connected to the output link of one of said doors and pivotally connected to said input link on a first side of said central support; and a second drive link pivotally connected to the output link of the other of said doors and pivotally connected to said input link on a second side of said central support.

8. An actuating mechanism as in claim 7 further comprising:

said first actuator connected to pivot said input link around said central pin support; and said second actuator connected to translate said pin support with respect to said airframe.

* * * * *